(12) United States Patent
Al Agha et al.

(10) Patent No.: US 9,491,088 B2
(45) Date of Patent: Nov. 8, 2016

(54) DISTRIBUTED SYSTEM AND METHOD FOR SHARING CAPACITY IN AN AD-HOC NETWORK

(71) Applicant: GREEN COMMUNICATIONS, Orsay (FR)

(72) Inventors: Khaldoun Al Agha, Paris (FR); Nicolas Cavallari, Montigny le Bretonneux (FR); Thomas Claveirole, Paris (FR); Ignacy Gawedzki, Paris (FR)

(73) Assignee: Green Communications, Orsay (FR)

( * ) Notice: Subject to any disclaimer, the term of this patent is extended or adjusted under 35 U.S.C. 154(b) by 74 days.

(21) Appl. No.: 14/495,743

(22) Filed: Sep. 24, 2014

(65) Prior Publication Data

US 2015/0085702 A1 Mar. 26, 2015

(30) Foreign Application Priority Data

Sep. 25, 2013 (FR) ...................................... 13 59228

(51) Int. Cl.
*H04L 12/28* (2006.01)
*H04L 12/751* (2013.01)
*H04L 12/733* (2013.01)
*H04W 74/08* (2009.01)
*H04W 84/18* (2009.01)
*H04W 74/00* (2009.01)

(52) U.S. Cl.
CPC ............ *H04L 45/02* (2013.01); *H04L 45/122* (2013.01); *H04W 74/085* (2013.01); *H04W 74/008* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 7,773,558 B2 * | 8/2010 | Cho | H04W 16/10 370/329 |
| 2004/0114521 A1 | 6/2004 | Sugaya | |
| 2012/0257545 A1 * | 10/2012 | Al Agha | H04L 45/00 370/255 |

OTHER PUBLICATIONS

Tan et al, Congestion Control in Multi-Hop Wireless Networks, IEEE, 11 pages, 2005.*
Simon Odou, et al., "Admission Control Based on Dynamic Rate Constraints in Multi-hop Networks", Wireless Communications and Networking Conference, Apr. 5, 2009, pp. 1-6, IEEE, Piscataway, NJ, USA, XP031454059.
Rajarshi Gupta, et al., "Sufficient Rate Constraints for QoS Flows in Ad-Hoc Networks", Ad-Hoc Networks, Feb. 20, 2007, pp. 429-443, vol. 5, No. 4, Elsevier, Amsterdam, NL, XP005895938.

* cited by examiner

*Primary Examiner* — Frank Duong
(74) *Attorney, Agent, or Firm* — Baker & Hostetler LLP

(57) ABSTRACT

A system is provided for sharing capacity in a communications network comprising a set of nodes sharing common resources, where the nodes are able to be connected by pairs via communications links. Each node is capable of locally holding at least one set of triplets (k, l, $N_{kl}$) which associates, with each link (k, l), an expiration time $N_{kl}$ representing the date until which the associated link may be considered as unused. The nodes are furthermore configured for periodically exchanging, according to a predefined period p, control messages over a set of links, each control message sent over a given link by a node comprising the sets of triplets held locally by the node and which correspond to the links that are in conflict with said given link.

15 Claims, 5 Drawing Sheets

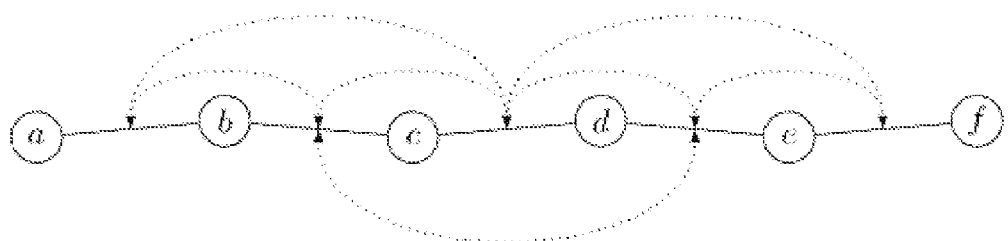
FIGURE 1
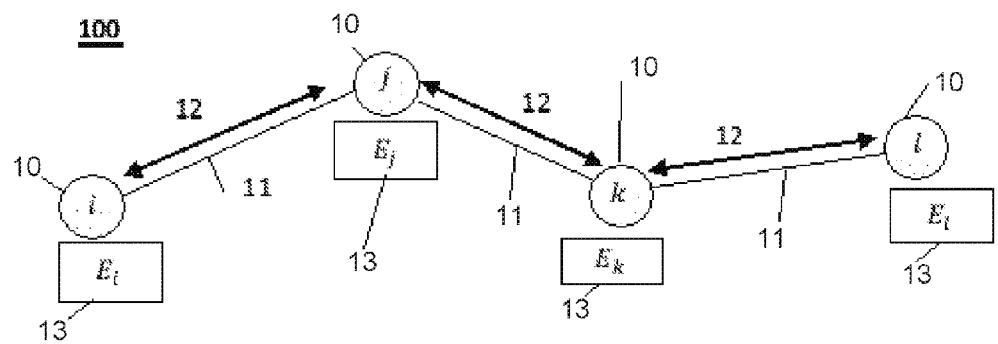
FIGURE 2A
$$E_a = \left\{ \begin{array}{l} (a,b,N_{ab}),(b,a,N_{ba}), \\ (b,c,N_{bc}),(c,b,N_{cb}), \\ (c,d,N_{cd}),(d,c,N_{dc}) \end{array} \right\} \quad \text{and} \quad E_b = \left\{ \begin{array}{l} (a,b,N_{ab}),(b,a,N_{ba}), \\ (b,c,N_{bc}),(c,b,N_{cb}), \\ (c,d,N_{cd}),(d,c,N_{dc}), \\ (d,e,N_{de}),(e,d,N_{ed}) \end{array} \right\}$$
FIGURE 2B

DISTRIBUTED SYSTEM AND METHOD FOR SHARING CAPACITY IN AN AD-HOC NETWORK

CROSS-REFERENCE TO RELATED APPLICATION

This application claims priority to foreign French patent application No. FR 1359228, filed on Sep. 25, 2013, the disclosure of which is incorporated by reference in its entirety.

FIELD OF THE INVENTION

The invention generally relates to telecommunications networks and in particular to wireless telecommunications networks of the ad-hoc type.

BACKGROUND

Ad-hoc mobile networks are wireless networks capable of organizing themselves without any previously defined infrastructure. In an ad-hoc network, the radio communications medium is shared by the stations which are within mutual range of each other. The stations of the same network thus share between them the transmission medium so as to be able to emit or to receive packets. When two stations emit at the same time over a transmission medium, there exists a risk of collision.

A known random access protocol called CSMA/CA (acronym for Carrier Sense Multiple Access with Collision Avoidance) can be used for avoiding such collisions in the network. According to this access method, each station (otherwise known as a "node" hereinafter) is free to communicate when the transmission channel is free, in other words when no signal in progress is detected. Acknowledgements of receipt (ACK) are generally used for determining whether a transmission has failed, notably due to a collision. When such a situation occurs, the stations generally wait for a random time prior to re-starting the transmission, which reduces the probability of collision.

The CSMA/CA method is based on a mutual exclusion which may be expressed in the form of a conflict relationship between the links for access to a common resource. When the ad-hoc network uses protocols from the family of standards IEEE 802.11, it is assumed that a conflict relationship exists between the links connecting two stations whenever these links are sufficiently close, in the sense of the topology. More precisely, it is considered that a conflict relationship exists between two links (a,b) and (a',b') if the minimum distance in number of hops in the topology between the pairs of nodes {a,a'}, {a,b'}, {b,a'} and {b,b'} is less than or equal to a parameter N−1 (a, b, a' and b' denoting nodes). The parameter N represents a number of hops defined by the routing protocol and is such that each node can acquire the knowledge of the topology of the network up to at least N+1 hops.

The CSMA/CA random access method thus allows certain simultaneous transmissions that would risk interfering with each other to be avoided, and the retransmissions of messages to be limited. However, the CSMA/CA access method does not allow the common resource to be distributed equitably between the links in conflict. The result of this is shortages of resource over some links when other links in conflict with the latter are too heavily solicited.

SUMMARY OF THE INVENTION

The invention is designed to improve the situation. For this purpose, it provides a system for sharing capacity in a communications network comprising a set of nodes sharing common resources, where the nodes are able to be connected from one to the next via communications links. According to one aspect of the invention, each node is capable of locally holding at least one set of triplets (k, l, $N_{kl}$) which associates, with each link (k, l), an expiration time $N_{kl}$ representing the date until which the associated link may be considered as unused, whereas the nodes are configured for periodically exchanging, according to a predefined period p, control messages over a set of links, each control message sent over a given link by a node comprising the sets of triplets held locally by the node and which correspond to the links that are in conflict with the given link.

In particular, the sets held locally on each node can comprise triplets relating to the links adjacent to the node and to the links with which the adjacent links are in conflict.

According to one feature of the invention, each control message sent by a given node i over a link (i, j) can comprise the elements of the sets of triplets which correspond to the links that are in conflict with the link (i, j).

According to another feature of the invention, each node can be capable of updating an expiration time associated with a given link in the set of triplets that it holds, in response to receiving a control message comprising a new value for the expiration time of the link which is later than its current value.

Furthermore, each node can be capable of updating the expiration times associated with its outgoing links in the set of triplets that it holds, prior to sending a control message.

In one embodiment of the invention, for any outgoing link unused at the date t in question, the expiration time for this link can be updated to the value t+Q, where Q represents an interval of time during which the outgoing link is to be considered as unused by the other nodes.

In particular, the period p for transmission of control messages over each link by a given node can be chosen in such a manner that:

$$Q > (N+1) \times p$$

where N denotes the distance that is strictly maximum in number of hops up to which a node can acquire the knowledge of another node within the topology of the network.

The expiration time for a given link may be discretized and factorized into N+1 values, the parameter N denoting the distance that is strictly maximum in number of hops up to which a node can acquire the knowledge of another node within the topology of the network, each node being capable of generating N+1 discrete sets of triplets $E_{ij}^n$, for a value n in the range between 0 and N, for sending a control message and of including said N+1 discrete sets of triplets $E_{ij}^n$ within the control message prior to sending it. The N+1 discrete sets of triplets $E_{ij}^n$ can be generated starting from the sets of triplets held locally by the node and from information on topology.

The discretization interval can notably be obtained from the duration $\Delta_n$ as follows:

$$\forall n = 0, \ldots, N \quad \Delta_n = \frac{n+1}{N+1} \times Q.$$

According to another feature of the invention, the generation of a control message by a node i over a link (i, j) can comprise, at a date t, for any link (i, l), the extension of the expiration time associated with said link in conflict to the value t+Q, if the link in conflict is not frequently used and the reduction of the expiration time associated with the link (i, l) to the value t if the link is frequently used.

In one particular embodiment of the invention, each node can use a Bloom filter for representing the sets $E_{ij}^0, \ldots, E_{ij}^N$ associated with a given link (i, j), the Bloom filter comprising a table of m bits and k hash functions in order to associate each link with k keys, the keys corresponding to positions in the table, whereas the system uses the Bloom filter for determining with certainty if a link is not contained in the set $E_{ij}^n$.

The reception of a control message comprising the sets $E_{ij}^0, \ldots, E_{ij}^n$ over a link (i, j), by a node j, at a date t, can then comprise, for each link (k, l) in conflict with said link (i, j), where k is distinct from i and for any value of n between 0 and N:

the reduction of the expiration time $N_{kl}$ for the link (k, l) to the value $t+\Delta_{n-1}$ if the distance between the node i and the node k is strictly less than the distance between the node j and the node k in number of hops, if the link (k, l) is in the set $E_{ij}^n$;

the extension of the expiration time $N_{kl}$ for the link (k, l) to the value $t+\Delta_n$ if the link (k, l) is not in the set $E_{ij}^n$.

Furthermore, the generation of a control message over a link (i, j), at a date t, can comprise for each link (i, l):

the reduction of the expiration time $N_{il}$ for the link (i, l) to the value t if the link (i, l) is frequently used;

the extension of the expiration time $N_{il}$ for the link (i, l) to the value t+Q if the link (i, l) is not frequently used.

The generation of a control message over a link (i, j), at a date t, can comprise, for each link (k, l) in conflict with the link (i, j) such that l is distinct from j and for any value of n between 0 and N, the insertion of the link (k, l) into the set $E_{ij}^n$, if $N_{kl}$ is strictly less than $t+\Delta_n$.

The invention furthermore provides a method for sharing capacity within a communications network comprising a set of nodes sharing common resources, where the nodes are able to be connected by pairs via communications links. The method advantageously comprises the steps consisting in:

locally holding on each node at least one set of triplets (k, l, $N_{kl}$) which associates, with each link (k, l), an expiration time $N_{kl}$ representing the date until which the associated link may be considered as unused, sending periodically, according to a predefined period p, control messages from each node over a set of chosen links, each control message sent over a given link by a node comprising the elements of the sets of triplets held locally by the node which correspond to the links that are in conflict with the given link.

The distributed system and method for sharing capacity according to the invention thus allow the data rate upstream of each link to be limited. They notably allow an equitable sharing of capacity by optimizing the share of resource assigned to each link. The improvement in the sharing of the common resource has a direct impact on the correct operation of the network.

BRIEF DESCRIPTION OF THE DRAWINGS

Other features and advantages of the invention will become apparent with the aid of the description that follows and of the figures of the appended drawings in which:

FIG. 1 illustrates the conflict relationships in one example of a topology with six nodes for a parameter N=2;

FIG. 2A shows the architecture of a distributed system for equitable sharing of common resources within a network, according to certain embodiments of the invention;

FIG. 2B shows examples of triplets, according to certain embodiments of the invention;

Figure 3:
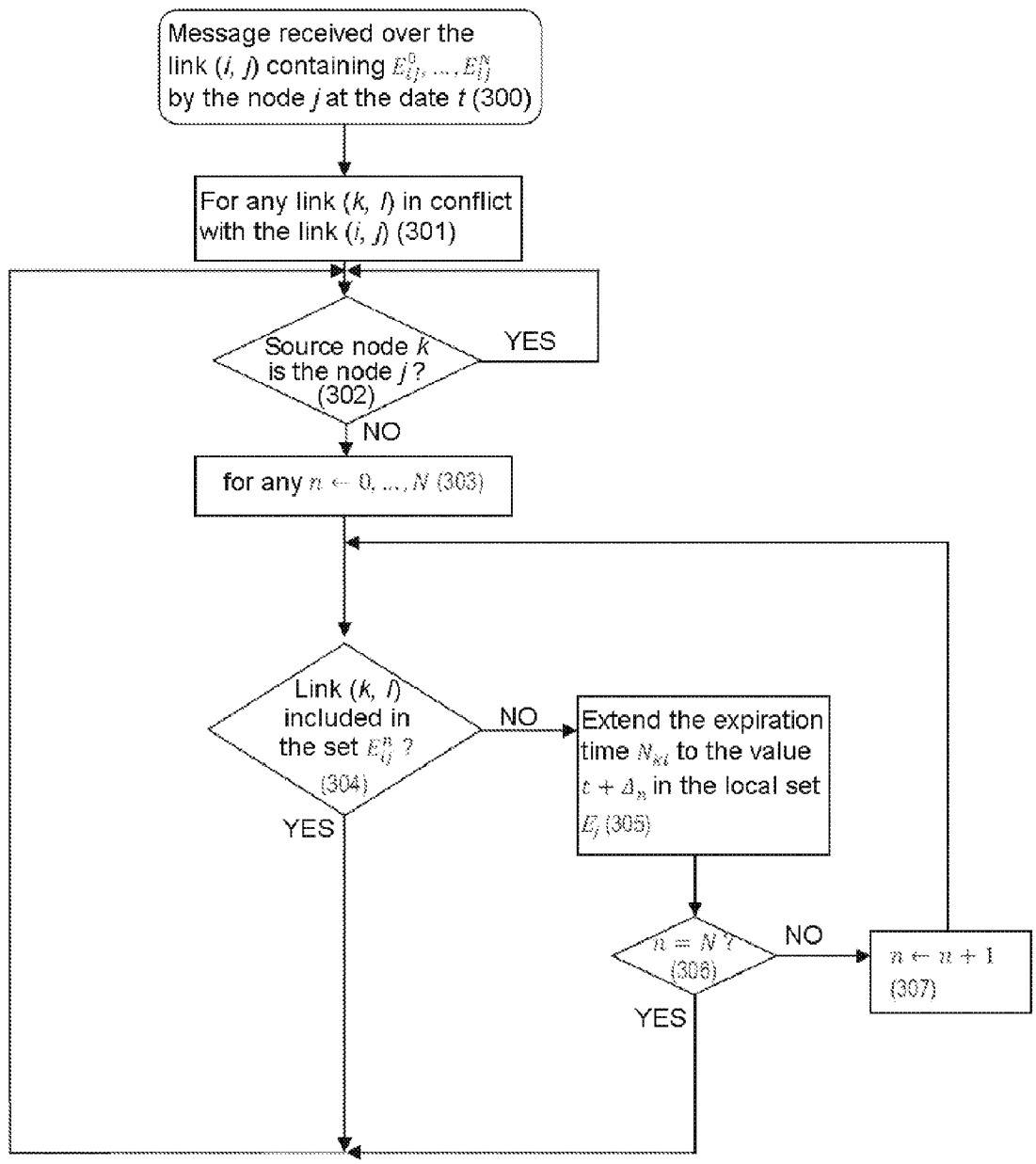
FIG. 3 is a flow diagram describing the method of interpretation of a factorized message according to one embodiment of the present invention.

The drawings mainly comprise elements which may not only be used for a better understanding of the description, but also contribute to the definition of the invention, where appropriate.

DETAILED DESCRIPTION

FIG. 1 illustrates the conflict relationships which exist in a topology comprising six nodes (a, b, c, d, e, f), within a mobile network of the ad-hoc type, where the parameter N is fixed at 2. N denotes the number of hops defined by the routing protocol such that each node can acquire the knowledge of the topology of the network up to at least N+1 hops. Thus, in the example of FIG. 1, each node can acquire the knowledge of the topology of the network up to at least 3 hops.

As shown in the example in FIG. 1, the link (a, b) is in conflict with five other links: (b, a), (b, c), (c, b), (c, d) and (d, c). Indeed, for each of these links, at least one end is one hop or less than one hop in distance away from a or from b. For the other links, the distances are too great. Thus, for the link (d, e), d is 3 hops away from a and 2 hops away from b, e is 4 hops away from a and 3 hops away from b, etc.

In the conventional networks using a routing protocol which allows each node to acquire the knowledge of the topology of the network up to at least N+1 hops, a given node can know which are the other links with which each outgoing link is in conflict. The node can then calculate, for each of its outgoing links, the maximum share of time for which it can effectively use a link without preventing the links in conflict from being used for an equal share of time. Indeed, with the knowledge of the local topology going to at least N+1 hops, a node can calculate a conflict graph which allows it to know all the cliques (maximum complete sub-graphs) to which its outgoing links belong. The maximum time share usable by a link is then the inverse of the size of the largest clique of the conflict graph to which it belongs.

The outgoing links for a given node denote the links for which the given node can limit the data rate upstream. A given node can only limit upstream the links for which it is the transmitter.

In the example in FIG. 1, as the link (a, b) is in conflict with the five other links (b, a), (b, c), (c, b), (c, d) and (d, c), the node a must limit the use of the link (a, b) to ⅙ of the time. Indeed, in the example in FIG. 1, all the links in conflict with (a, b) form a single clique (maximum complete sub-graph). Thus, the largest clique to which the link (a, b) belongs is composed of 6 links. As a consequence, the link (a, b) must not be used for more than ⅙ of the time. Considering the link (b, c), the following two cliques can be observed:

{(a, b), (b, a), (b, c), (c, b), (c, d), (d, c)} and {(b, c), (c, b), (c, d), (d, c), (d, e), (e, d)}.

These two cliques are of the same size (6) such that the time share usable by the link (b, c) is ⅙.

However, such a proactive approach has the drawback of reserving an equal share of resource even when a link is not used. Thus, in the example in FIG. 1, if only the link (a, b) is used, then ⅚ of the time will be reserved for links which will not use this resource.

The invention improves the situation by providing a distributed system for sharing capacity, based on a reactive distributed approach which allows the nodes to be informed on the effective uses of the links and thus allows them to share all the available resource between the links effectively used.

In the present description, the following notation will be used to express the existence of a conflict between two links (i, j) and (k, l): (i, j)⊕(k, l).

By convention, it will furthermore be assumed that a link is in conflict with itself ((i, j)⊕(i, j)) and is in conflict with the link in the opposite direction ((i, j)⊕(j, i)).

FIG. 2A shows a distributed system for sharing capacity 100 according to certain embodiments of the invention. The sharing system 100 comprises a set of nodes 10 able to be connected by pairs via links 11.

According to one aspect of the invention, the system for sharing capacity 100 is based on the exchange of periodic control messages 12 between the nodes 10 over all the links 11, according to a period p.

Such an exchange is provided in order to allow each node i to locally hold a set $E_i$ of triplets (k, l, $N_{kl}$) which associates a date $N_{kl}$ with each link (k, l), otherwise referred to as "expiration time" hereinafter. The expiration time $N_{kl}$ for a given link (k, l) represents the date until which the link may be considered as unused. In particular, the expiration times $N_{kl}$ may represent a date that is close with respect to the current date. The expiration times $N_{kl}$ can then be compressed by omitting the information on the current date. More generally, the format chosen for the expiration times, and notably the precision of the chosen format, can depend on the chosen parameter p.

Each set $E_i$ of triplets held in a given node i comprises one entry for any link in conflict with an outgoing link of i. These may be links for which none of the ends corresponds to the node i.

Each node i can comprise at least one data structure 13 for holding the sets $E_i$. The data structures 13 used to hold the sets $E_i$ may comprise, without limitation, lists, tables, trees, hash tables, etc.

In one embodiment of the invention, the set $E_i$ for a given node i comprises triplets for the set of the links adjacent to this node, and also for the links with which the adjacent links are in conflict. A link adjacent to a given node i corresponds to a link one of the ends of which is the node i. The links adjacent to a given node thus form the union of the incoming links and of the outgoing links of this node.

For example, the nodes a and b in FIG. 1 respectively comprise the following sets $E_a$ and $E_b$ in FIG. 2B.

In the example in FIG. 2B, for the node a, the adjacent links are (a, b) and (b, a), the others being (b, c), (c, b), (c, d) and (d, c). For the node b, the adjacent links are (a, b), (b, a), (b, c) and (c, b), the others being (c, d), (d, c), (d, e) and (e, d).

According to another aspect of the invention, each control message sent by a node i over a link (i, j) comprises the elements of the set $E_i$ which correspond to the links that are in conflict with (i, j). The set of the elements sent in each control message will be denoted in the following as $E_{ij}$.

The following notation can thus be used for characterizing the elements of the set $E_{ij}$:

$$E_{ij} = \{(k, l, N_{kl}) \in E_i; (i,j) \oplus (k,l)\}.$$

By hypothesis, the links in conflict with (i, j) correspond to the links in conflict with (j, i) ((i, j)⊕(j, i)). Thus, in response to the reception of a control message from a node i by a node j, the node j can update its set $E_j$ by using the information from the set $E_{ij}$.

Thus, in the following part of the description, the set $E_i$ will denote a set effectively held by a node i whereas the set $E_{ij}$ will denote a sub-set of $E_i$ sent by i to j. Whereas a set $E_i$ is locally held by each node i, the sets $E_{ij}$ are generated starting from the local set $E_i$ and information on local topology at the moment of the generation of a control message by the node i.

According to another feature of the invention, each node j holding a set $E_j$ can be configured for updating an expiration time $N_{ab}$ corresponding to a link (a, b) in the set $E_{ij}$, according to updating rules. In particular, an updating rule for the expiration times can consist in modifying an expiration time $N_{ab}$ for a link (a, b) in the set $E_{ij}$ when a new value is received for this expiration time in a control message sent by the node i and when the new value is later than the current value of the expiration time in the set $E_j$.

Furthermore, prior to sending a control message, a given node i may be configured for updating the expiration times of its outgoing links in the set $E_i$. In particular, for any link (i, k) unused at the time t in question, the expiration time $N_{ik}$ is fixed at the value t+Q, where Q represents an interval of time during which the link (i, k) is to be considered as unused by the other nodes (irrespective of the value of the expiration time $N_{ik}$ at the time t when it is updated in such a manner as to reflect the effective use of the link (i, k)).

According to another aspect of the invention, the period p of transmission of the control messages over each link by a given node can be chosen in such a manner that:

$$Q > (N+1) \times p.$$

In one preferred embodiment of the invention, the parameters Q (interval of time during which the link (i, k) is to be considered as unused by the other nodes) and p (period p of transmission of the control messages over each link by a given node) are the same for all the nodes of the network.

According to a particular feature of the invention, the control messages 12 are sent periodically over all the outgoing links. However, the moments in time at which the control messages are sent can be asynchronous between the links.

The format of the control messages is chosen in such a manner that the node receiving the message can determine which node has sent it so as to know over which link its has been transmitted. For this purpose, each control message can use the source and destination addresses of the packet containing the message.

The control messages 12 may furthermore comprise other information. It is also possible to use existing messages having a suitable transmission frequency as control messages 12 in order to carry the information on the expiration times.

The control messages 12 may be sent in unicast mode. Mechanisms for receipt acknowledgement and for retransmissions may be used when the control messages have not been received. These mechanisms may notably be chosen in order to increase the probability of success of the transmission for an improved communication of the information.

The invention thus allows it to be avoided that an expiration time, recently updated by a node i when a control message is sent over a link (i, j), can expire on a node further away, between two receptions of a control message, if the link to which this expiration time relates is continually unused. Since the conflicts are defined to N hops, a node concerned by such an expiration time is located at the most N+1 hops away. In an extreme case, an expiration time updated by the node at the time t will arrive at the time t+(N+1)×p at a node separated from the node i by N+1 hops.

The parameter p is preferably defined globally for the whole system 100. The nodes are then configured prior to the start-up of the system for applying the period p defined by the system. In the situations where the transmissions of the control messages are considered as unreliable, the system 100 can reduce the period p accordingly in order to avoid a premature expiration of the expiration times.

Those skilled in the art will appreciate the fact that the expiration times relate to the non-uses of the links and not to the use of links. As a result, the system for sharing the resources 100 according to the embodiments of the invention is more robust against the inadvertent losses of messages. An expiration time which expires prematurely can have the consequence that a node erroneously considers a link as used and accordingly assigns a smaller time share to its outgoing links. A premature expiration corresponds to the expiration of an expiration time $N_{ij}$ for non-use of a link (i, j) within the set $E_{kl}$ of a node k in conflict with (i, j), while the link (i, j) remains unused. This can happen for example if the information is not communicated sufficiently quickly to k, for a particular reason (delay in the processing or the sending of the messages, losses of messages, etc). However, a premature expiration does not cause an over-use of the common resource.

In a network of the type of that shown in FIG. 2, the volume of data to be transmitted in each control message can generally increase very quickly as a function of the number of links in conflict.

Furthermore, the use of absolute dates for the expiration time can require a synchronization of the clocks of all the nodes, which may prove to be relatively complex in an ad-hoc network. For this purpose, it is possible for example to use a clock source common to all the nodes (e.g. GPS (acronym for Global Positioning System) receiver) or a synchronization protocol such as the NTP (acronym for Network Time Protocol) synchronization protocol.

In order to overcome these drawbacks, in one particular embodiment of the invention, the distributed system for sharing capacity 100 can be configured for discretizing and factorizing the expiration times into N+1 values.

In the following part of the description, the following periods of time defined as a function of n, N and Q will be used for discretizing and factorizing the expiration times, by way of non-limiting example:

$$\Delta_{-1} = 0$$

$$\forall n = 0, \ldots, N \Delta_n = \frac{n+1}{N+1} \times Q$$

These periods will be used with the current time t in order to define intervals of time in the future.

Furthermore, in this embodiment, the sets Eij are replaced by N+1 discrete sets $E_{ij}^n$ which are defined such that:

$$\begin{cases} E_{ij}^0 = \{(k, l) : (k, l, N_{kl}) \in E_{ij} \wedge N_{kl} < t + \Delta_0\} \\ E_{ij}^n = \{(k, l) : (k, l, N_{kl}) \in E_{ij} \wedge t + \Delta_{n-1} \leq N_{kl} < t + \Delta_n\} \end{cases}$$

$$\forall n = 1, \ldots, N.$$

The information on the effective use of the links is thus encoded within the discrete sets.

A control message (henceforth denoted "factorized control message") sent over a link thus comprises the (N+1) discrete sets $E_{ij}^0, \ldots, E_{ij}^N$ (each set $E_{ij}^n$ containing links in conflict with (i, j)) instead of the whole set $E_{ij}$. In response to receiving a factorized control message, a node j can implement a method of interpretation of the factorized message, according to certain embodiments of the invention.

By thus using factorized sets, the expiration times can be implicit. The messages then no longer comprise any absolute date and it is no longer necessary to have a reference that is common over time. In addition, with the use of intervals of time in the future instead of absolute dates, the clock synchronization is no longer necessary.

FIG. 3 is a flow diagram illustrating the method of interpretation of a factorized control message by a current node j, in response to the reception of a message received over the link (i, j) comprising sets $E_{ij}^0, \ldots, E_{ij}^N$, at a current date t (300).

For any link (k, l) in conflict with the link (i, j) (step 301), it is first of all determined whether the source k is not the current node j, at the step 302, based on information on topology held locally by the node j.

If the source k is distinct from the current node j, the steps 304 to 306 are carried out for each value of the index n going from 0 to N (step 303).

More precisely, at the step 304, it is determined whether the link (k, l) is not included in the set $E_{ij}^n$. For this purpose, the sets $E_{ij}^n$ are monitored according to an increasing order of the indices n. As long as the link (k, l) is not found in the set $E_{ij}^n$, it can be considered that the expiration time $N_{kl}$ satisfies: $N_{kl} \geq t + \Delta_n$. If the link (k, l) is not included in the set $E_{ij}^n$, at the step 305, the expiration time $N_{kl}$ of the link (k, l) is extended to $t + \Delta_n$. The expiration time of $N_{kl}$ is extended to the value $t + \Delta_n$ only if the current value of $N_{kl}$ is smaller than this value. The updating of the expiration time is done in the set $E_j$ local to the node j. The step for extension of the expiration time allows a larger value not to be reduced with information which has taken more time to arrive than fresher prior information. For example, by considering three nodes a, b, c, in a triangle and by assuming that:

a firstly receives a message from c which indicates to it that the link (c, b) is unused until a date $t_1$, a then receives a message from b which indicates to it that the link (c, b) is unused until a date $t_2$, such that $t_2 < t_1$, the expiration time for (c, b) will only be updated upon reception of the first message.

If the link (k, l) is already included in the set $E_{ij}^n$ (304), the next link is processed without considering the sets for the following indices n. More precisely, at the step 306, if n is different from N, n is incremented at the step 307 and the next set $E_{ij}^{n+1}$ is processed according to the steps 304 and 305. Otherwise, if n=N, a new link (k, l) in conflict with (i, j) is processed by iterating the step 301, if all the links have not yet all been processed. If all the links (k, l) in conflict with (i, j) have been processed, the method is finished.

Similarly, if it is determined at the step 304 that the link (k, l) is included in the set $E_{ij}^n$, a new link (k, j) in conflict with (i, j) is processed if they have not yet all been processed and if all the links (k, l) in conflict with (i, j) have already been processed, the method is finished.

The volume of information contained in a control message can depend on the number of links in conflict with the link over which the message is sent. According to a particular feature of the invention, it is then possible to assign a fixed size to the control messages by using particular data structures.

In one embodiment of the invention, Bloom filters can be used for representing the sets $E_{ij}^n$ and testing the presence of the links in the sets $E_{ij}^n$. A Bloom filter is a probabilistic representation of a set. Each node i thus holds the set $E_i$ and represents the sets $E_{ij}^n$ by Bloom filters. When a node j receives a message, it is able to know which are the links that are contained in the set $E_{ij}$ (the same as those of $E_{ji}$) and can test their presence in the sets $E_{ij}^n$ represented by Bloom filters in the message.

The use of Bloom filters for representing the sets $E_{ij}^n$ notably enables control messages of fixed size to be used.

Figure 4:
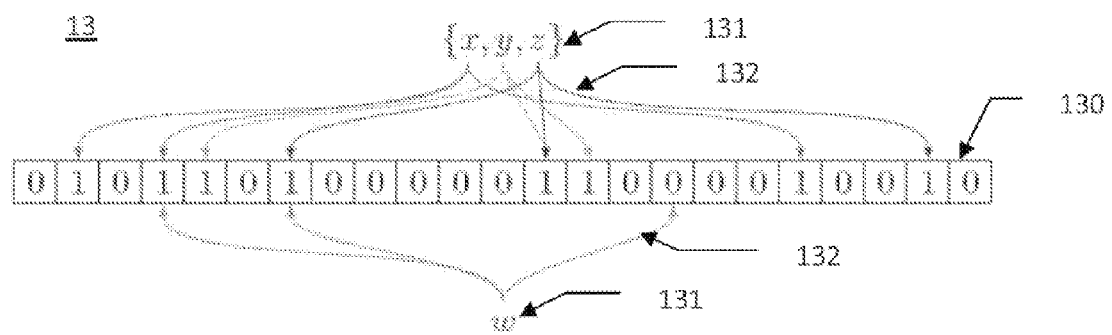
FIG. 4 shows one example of a Bloom filter representing a set {x, y, z}.

FIG. 4 shows one example of a Bloom filter 13. As shown in FIG. 4, a Bloom filter is a compact probabilistic data structure which allows it to be known with certainty that an element is not present in a set (absence of "false negatives") and allows it to be determined with a certain probability that it is present (possibility of "false positives"). This structure can notably be used at the step 304 in FIG. 3 in order to determine with certainty if the link (k, l) is not included in the set $E_{ij}^n$.

A Bloom filter can be implemented by using a table of bits 130 of size m and k hash functions $H_0, H_1, \ldots, H_{k-1}$ of the elements of the set in question. The set of hash functions allows a set of keys corresponding to positions in the table 130 to be associated with each element of the set.

The example in FIG. 4 is a simplified example illustrating the characteristics of a Bloom filter. The Bloom filter shown is associated with the elements 131 comprising a set {x, y, z} together with an element w. The arrows 132 indicate the positions in the table 130 with which the elements 131 (x, y, z and w) are associated by the three hash functions.

In order to construct a Bloom filter, the table is first of all reset to 0, then each element of the set is initialized by setting at 1 the cells of the table whose index is a key modulo m. In order to test whether an element of the table belongs to the set, its keys are first of all calculated by using the hash functions. Subsequently, for each of the keys calculated, it is determined whether the corresponding bit in the table is at 1. If at least one of these bits is at 0, it can be deduced with certainty that the element is not contained in the set represented. However, if all these bits are at 1, it is probable that the element is effectively contained within the set, without it however being established with certainty.

In the example in FIG. 4, the size of the table is m=23 and 3 hash functions are used (k=3). It may be determined using the table that the elements x, y and z are probably present and, with certainty, that the element w is not present in the set because one of the associated positions contains 0.

Each set $E_{ij}^n$ can thus be represented by a Bloom filter and can consequently occupy a fixed size in the control message. The presence of a link in the set $E_{ij}^n$ means that its non-use must not exceed the date $t+\Delta_{n-1}$. Thus, it may be considered that the link will be used starting from the date $t+\Delta_{n-1}$. A "false positive" in the set will mean that j will consider as "used" a link which in actual fact is "unused". However, a "used" link will not be considered as "unused", a fact which guarantees that the available resources will never be overused.

The links (k, l) are known by a node j by its own knowledge of the topology and the expiration times $N_{kl}$ can be deduced from the presence or otherwise of the links in the sets $E_{ij}^n$ represented by Bloom filters, which allows access to the triplets (k, l, $N_{kl}$).

Figure 5:
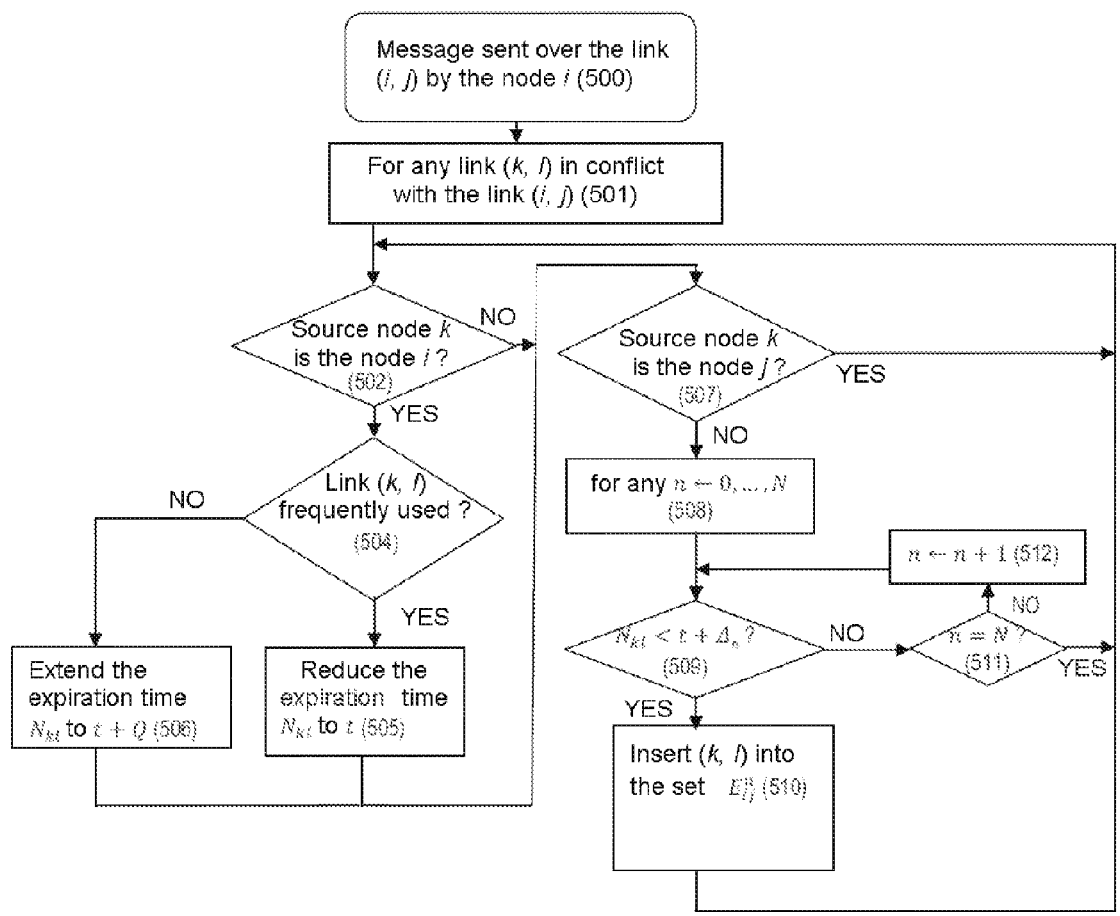
FIG. 5 is a flow diagram describing the method for generating an optimized message according to certain embodiments of the invention.

FIG. 5 is a flow diagram representing the method for generation of an optimized control message by a current node i, for a link (i, j) over which a control message is sent (500), according to certain embodiments of the invention.

For any link (k, l) in conflict with the link (i, j) (step 501), it is determined whether the source k corresponds to the current node i at the step 502.

If the source k corresponds to the current node i, it is subsequently determined whether the link (k, l) is frequently used at the step 504. The step 504 may be implemented in different ways depending on the application of the invention. For example, it can be determined whether the link (k, l) is frequently used by verifying that at least one packet of user data has been transmitted during the last second or any other period of time supplied by the system as a parameter.

If the link (k, l) is frequently used, at the step 505, the expiration time $N_{kl}$ of (k,l) is reduced to t. Otherwise, the expiration time $N_{kl}$ of (k, l) is extended to t+Q at the step 506.

At the step 507, it is determined whether the source k is the destination node j. If this is not the case, the steps 509 and 510 are carried out for any value of the index n going from 0 to N (508).

More precisely, at the step 509, it is determined whether the expiration time $N_{kl}$ of the link (k, l) is less than $t+\Delta_n$.

If the expiration time $N_{kl}$ is less than $t+\Delta_n$, at the step 510, the link (k, l) is inserted into the set $E_{ij}^n$.

If the expiration time $N_{kl}$ is greater than or equal to $t+\Delta_n$ (509), the steps 509 and 510 are iterated for a new value of n (steps 511 and 512) if n is different from N. If n is equal to N, or in response to the insertion of a link into the set $E_{ij}^n$ (510), another link in conflict with the link (i, j) is processed at the step 501. When all the links in conflict have been processed, the method is finished.

The source of the message thus reduces the expiration time of an outgoing link if the latter is currently being used (at the step 505). This method for generating an optimized control message allows the nodes which receive the messages to reduce an expiration time, under certain conditions, in order to communicate the information on the use of the links more rapidly.

Figure 6:
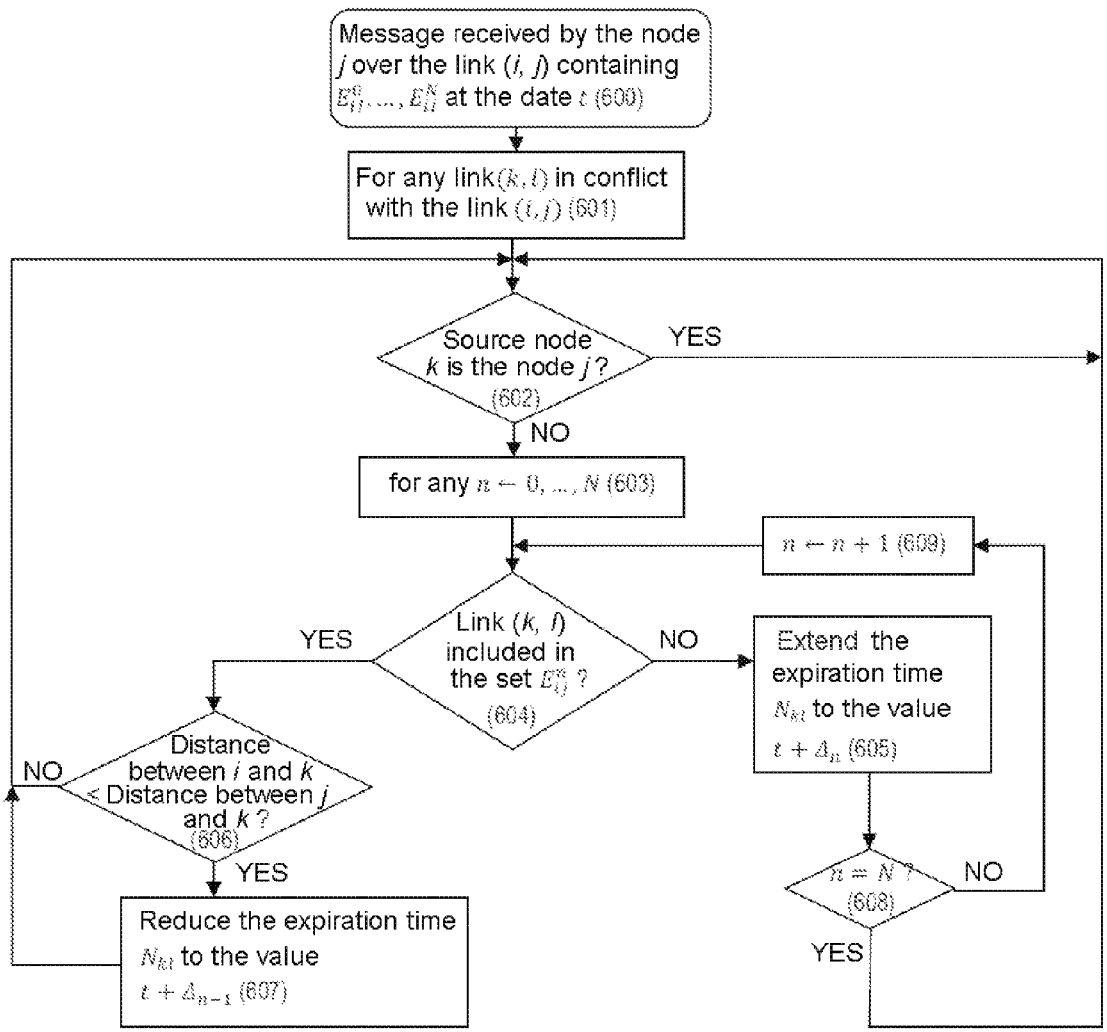
FIG. 6 is a flow diagram representing the method of interpretation of a factorized message according to another embodiment of the present invention.

FIG. 6 is a flow diagram illustrating the interpretation of such an optimized message, according to one preferred embodiment of the invention, by a current node j, in response to a message received over the link (i, j), for sets $E_{ij}^0, \ldots, E_{ij}^N$ contained in the message, at the current date t (600). The flow diagram in FIG. 6 constitutes an extension of the interpretation method in FIG. 3.

For any link (k, l) in conflict with the link (i, j) (601), it is determined whether the source k is the current node at the step 602.

If the source k is not the current node, the step 604 is realized for any value of the index n between 0 and N (603).

More precisely, at the step 604, it is determined whether the link (k, l) is not included within the set $E_{ij}^n$. If the link (k, l) is not included within the set $E_{ij}^n$, the expiration time of (k, l) is extended to $t+\Delta_n$ at the step 605.

Otherwise, if the link (k, l) is included within the set $E_{ij}^n$, it is determined whether the distance between i and k is strictly less than the distance between j and k (distance in number of hops), at the step 606.

If the distance between i and k is strictly less than the distance between j and k, the expiration time of (k, l) is reduced to $t+\Delta_{n-1}$ at the step 607. Thus, if the node i is closer to the source of the link (k, l) than j, then it is very probable that the information communicated by i is "fresher" than that already known from j. This is why j can then reduce the expiration time of (k, l). It is consequently possible to communicate the information on the use of the links efficiently. Indeed, when a link begins to be used, it is pointless to wait for its expiration time to expire in the other nodes in order to recover the share of resource that it is desired to assign to it, given that the nodes react faster to this change.

If the distance between i and k is greater than or equal to the distance between j and k, or in response to the updating of the expiration time $N_{kl}$ (607), another link (k, l) in conflict with (i, j) is processed at the step 601. When all the links have been processed, the method is finished.

In response to the extension of the expiration time of (k, l) (605), if n is different from N, n is incremented at the step 608 and the next set $E_{ij}^{n+1}$ is processed at the step 604. Otherwise, if n=N, a new link (k, l) in conflict with (i, j) is processed by iterating the step 601, if all the links have not all yet been processed. If all the links (k, l) in conflict with (i, j) have been processed, the method is finished.

The sharing system 100 may, as a complement, use a protocol for discovering the local topology in order to enable the nodes to generate the sets $E_{ij}^n$ at the time of the generation of a control message 12. The discovery protocol can form part of the routing protocol used, as in the case for example of the OLSR (acronym for "Optimized Link State Routing") routing protocol designed for meshed, wireless or mobile networks.

The use of the expiration times, according to the embodiments of the invention described, consequently allows it to be known, at any given moment, which are the links to be considered as used. When the usable share of resource is updated by an outgoing link, the system 100 can determine what is the maximum number of links used in the cliques of the conflict graph containing the outgoing link in question.

The invention thus allows the information on the effective use of the links in the network to be communicated to the nodes potentially concerned.

This results in an equitable distribution of the common resource between the links in conflict, a situation which allows the shortages of resource over some links to be limited when other links in conflict with the latter are too heavily solicited.

The invention is not limited to the embodiments described hereinabove by way of non-limiting example. It encompasses all the variant embodiments that could be envisioned by those skilled in the art. In particular, although the invention is particularly advantageous for ad-hoc networks, it is not limited to such communications networks and may be applied to other types of communications networks in which the resources for the links are common. Nor is the invention limited to particular common resources. For example, the common resource shared between the nodes can be the capacity (maximum data rate in bits-per-second), or any other type of resources shared between several neighboring links.

Those skilled in the art will understand that the distributed system for sharing capacity according to the embodiments of the invention together with its sub-components may be implemented in various ways by hardware, software, or a combination of hardware and software.

In particular, the elements of the system for sharing capacity may be combined or separated into sub-elements for implementing the invention. Furthermore, they may be implemented in the form of computer programs executed by a processor. A computer program is a set of instructions which may be used, directly or indirectly, by a computer.

A computer program may be written in any given programming language, including compiled or interpreted languages, and it may be deployed in any given form within the chosen data processing environment.

The invention claimed is:

1. A system for sharing capacity in a communications network comprising a set of nodes sharing common resources, where the nodes are connected by pairs via communications links,
   wherein each node is configured to locally hold at least one set of triplets (k, l, $N_{kl}$) which associates, with each link (k, l), an expiration time $N_{kl}$ representing a date until which the associated link is considered as unused and the nodes are configured to periodically exchange, according to a predefined period p, control messages over a set of links, and
   each control message sent over a given link by a node comprising the sets of triplets held locally by said node and which correspond to the links that are in conflict with said given link.

2. The system for sharing capacity as claimed in claim 1, wherein the sets of triplets that are held locally on each node comprise triplets related to the links adjacent to the node and to the links with which the adjacent links are in conflict.

3. The system for sharing capacity as claimed in claim 2, wherein each control message sent by a given node i over a link (i, j) comprises the elements of the sets of triplets which correspond to the links that are in conflict with the link (i, j).

4. The system for sharing capacity as claimed in claim 1, wherein each node is capable of updating an expiration time associated with a given link in the set of triplets that it holds, in response to receiving a control message comprising a new value for the expiration time of said link which is later than its current value.

5. The system for sharing capacity as claimed in claim 1, wherein each node is configured to update the expiration times associated with its outgoing links in the set of triplets that it holds, prior to sending a control message.

6. The system for sharing capacity as claimed in claim 5, wherein for any outgoing link unused at the date t in question, the expiration time for this link is updated to the value t+Q, where Q represents an interval of time during which the outgoing link is to be considered as unused by the other nodes.

7. The system for sharing capacity as claimed in claim 6, wherein the period p for transmission of control messages over each link by a given node is chosen in such a manner that:

$$Q > (N+1) \times p$$

where N+1 denotes a distance that is strictly maximum in number of hops up to which a node can acquire a knowledge of another node within a topology of the network.

8. The system for sharing capacity as claimed in claim 1, wherein the expiration time for a given link is discretized and factorized into N+1 values, the parameter N+1 denoting the distance that is strictly maximum in number of hops up to which a node can acquire the knowledge of another node within the topology of the network and in that each node is configured to generate N+1 discrete sets of triplets $E_{ij}^n$, for a value n in the range between 0 and N, for sending a control message and of including said N+1 discrete sets of triplets $E_{ij}^n$ within the control message prior to sending it, said N+1 discrete sets of triplets $E_{ij}^n$ being generated starting from the sets of triplets held locally by the node and from information on topology.

9. The system for sharing capacity as claimed in claim 8, wherein the discretization interval is obtained from a duration $\Delta_n$ as follows:

$$\forall n = 0, \ldots, N \quad \Delta_n = \frac{n+1}{N+1} \times Q.$$

10. The system for sharing capacity as claimed in claim 8, wherein the generation of a control message by a node i over a link (i, j) comprises, at a date t, for any link (i, l), the extension of the expiration time associated with said link in conflict to the value t+Q, if the link in conflict is not frequently used and a reduction of the expiration time associated with the link (i, l) to the value t if the link is frequently used.

11. The system for sharing capacity as claimed in claim 8, wherein each node uses a Bloom filter for representing the sets $E_{ij}^0, \ldots, E_{ij}^N$ associated with a given link (i, j), the Bloom filter comprising a table of m bits and k hash functions in order to associate each link with k keys, the keys corresponding to positions in the table and in that the system uses the Bloom filter for determining with certainty if a link is not contained in the set $E_{ij}^n$.

12. The system for sharing capacity as claimed in claim 11, wherein the reception of a control message comprising the sets $E_{ij}^0, \ldots, E_{ij}^N$ over a link (i, j), by a node j, at a date t, comprises, for each link (k, l) in conflict with said link (i, j), where k is distinct from i and for any value of n between 0 and N:

the reduction of the expiration time $N_{kl}$ for the link (k, l) to the value $t+\Delta_{n-1}$ if the distance between the node i and the node k is strictly less than the distance between the node j and the node k in number of hops, if the link (k, l) is in the set $E_{ij}^n$ (604);

the extension of the expiration time $N_{kl}$ for the link (k, l) to the value $t+\Delta_n$ if the link (k, l) is not in the set $E_{ij}^n$ (604).

13. The system for sharing capacity as claimed in claim 11, wherein the generation of a control message over a link (i, j), at a date t, comprises for each link (i, l):

the reduction of the expiration time $N_{il}$ for the link (i, l) to the value t if the link (i, l) is frequently used;

the extension of the expiration time $N_{il}$ for the link (i, l) to the value t+Q if the link (i, l) is not frequently used.

14. The system for sharing capacity as claimed in claim 11, wherein the generation of a control message over a link (i, j), at a date t, comprises, for each link (k, l) in conflict with the link (i, j), such that l is distinct from j and for any value of n between 0 and N, the insertion of the link (k, l) into the set $E_{ij}^n$, if $N_{kl}$ is strictly less than $t+\Delta_n$.

15. A method for sharing capacity implemented in a communications network comprising a set of nodes sharing common resources, where the nodes are connected by pairs via communications links, the method comprising:

locally holding at each node at least one set of triplets (k, l, $N_{kl}$) which associates, with each link (k, l), an expiration time $N_{kl}$ representing a date until which the associated link is considered as unused, and sending periodically, according to a predefined period p, control messages from each node over a set of chosen links, each control message sent over a given link by a node comprising elements of the sets of triplets held locally by the node and which correspond to the links that are in conflict with said given link.

* * * * *